Figure 4:
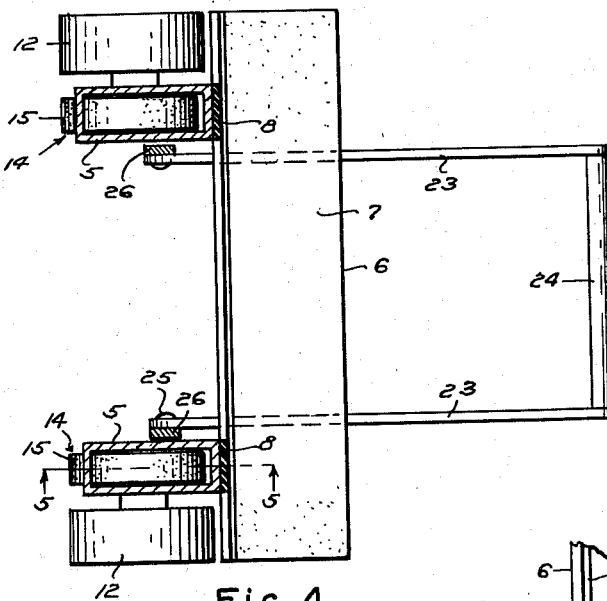

Dec. 25, 1956  J. C. CHENETTE  2,775,463
APPLIANCE HAND TRUCK HAVING ENDLESS TREAD STAIR CLIMBING DEVICE
Filed Dec. 13, 1954  2 Sheets-Sheet 1
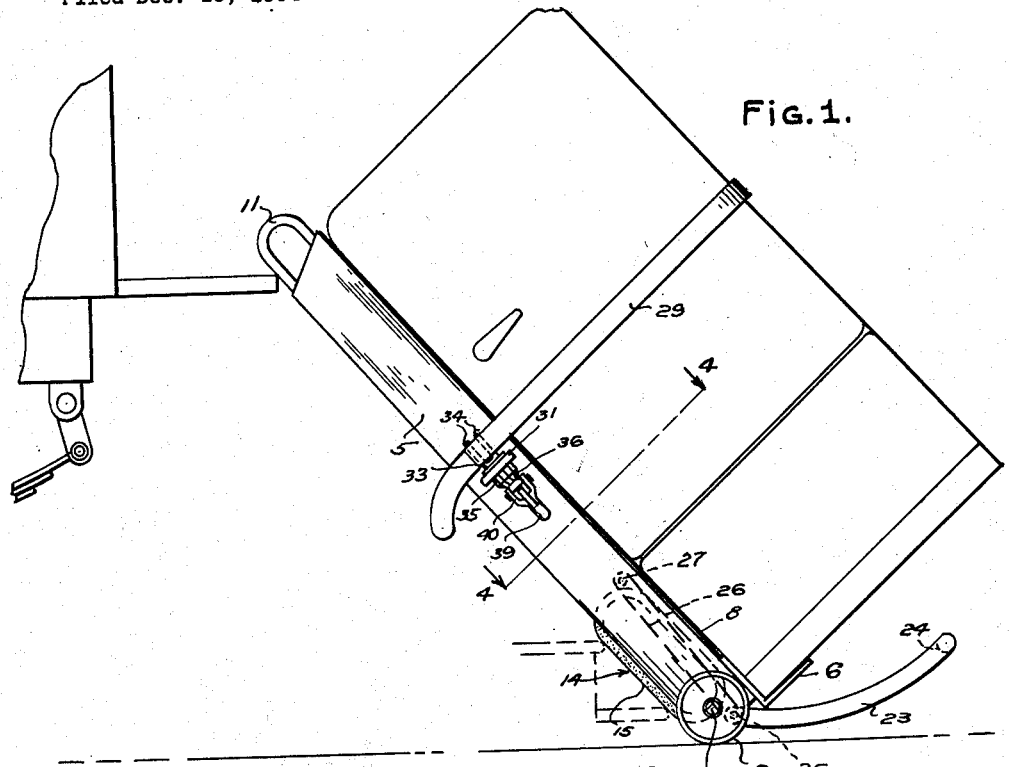
INVENTOR.
JOSEPH C. CHENETTE,
BY
ATTORNEY Dec. 25, 1956  J. C. CHENETTE  2,775,463
APPLIANCE HAND TRUCK HAVING ENDLESS TREAD STAIR CLIMBING DEVICE
Filed Dec. 13, 1954  2 Sheets-Sheet 2

INVENTOR.
JOSEPH C. CHENETTE,
BY
ATTORNEY

United States Patent Office 2,775,463
Patented Dec. 25, 1956

2,775,463

APPLIANCE HAND TRUCK HAVING ENDLESS TREAD STAIR CLIMBING DEVICE

Joseph C. Chenette, Hollywood, Fla.

Application December 13, 1954, Serial No. 474,783

1 Claim. (Cl. 280—5.22)

This invention relates to improvements in hand trucks of the type commonly employed for handling and transporting relatively heavy articles, such as refrigerators, stoves, water heaters or the like.

An object of the invention resides in providing a hand truck having in combination a novel form of endless belt tracks whereby the truck may be easily and conveniently shifted up a conventional stairway.

A further object of the invention resides in a novel form of tensioning means for the usual and well known restraining strap employed to retain the appliance upon the truck against shifting during the movement thereof.

A further important object of the invention resides in a novel form of retractable handle device that is normally retracted to a nested position between the side frame members of the truck and which may be quickly and easily extended downwardly and forwardly for disposing the handle in a convenient position beneath the appliance as an aid in lifting or otherwise shifting the truck and its supported appliance.

Novel features of construction and arrangement of parts will be more clearly apparent during the course of the following description, reference being had to the accompanying drawings wherein has been illustrated a preferred form of the device and wherein like characters of reference are employed to denote like parts throughout the several figures.

Figure 5:
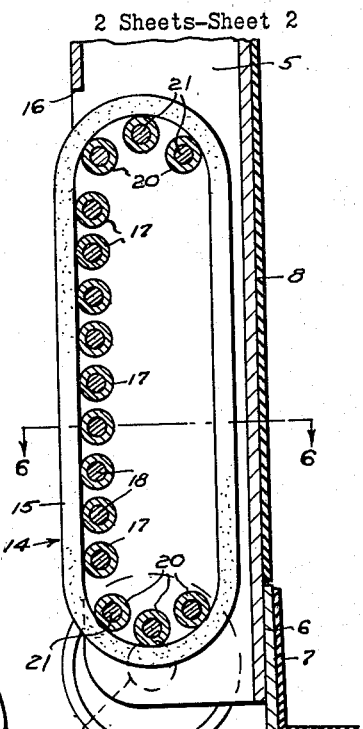
Figure 6:
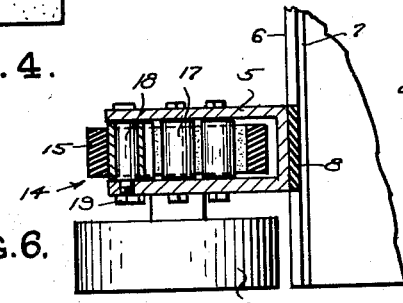
Figure 7:
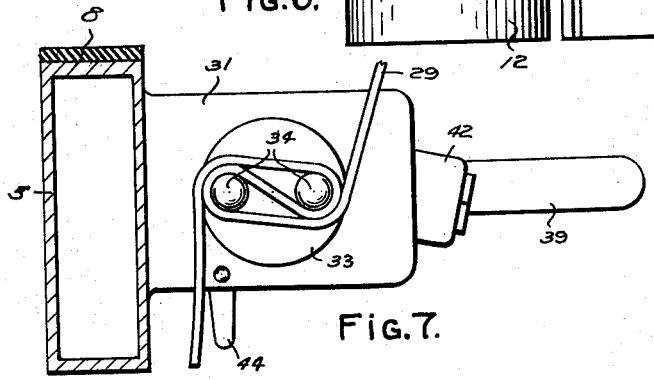
Figure 8:
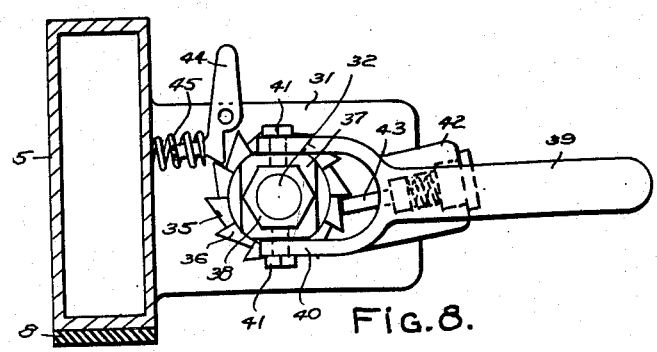

In the drawings:

Figure 1 is a side elevation of a hand truck constructed in accordance with the invention showing the same in the initial position of loading an appliance upon a vehicle, Figure 2 is a rear elevation of the device, Figure 3 is a fragmentary vertical section taken on line 3—3 of Figure 2, illustrating a novel form of auxiliary handle, Figure 4 is a slightly enlarged horizontal section taken on line 4—4 of Figure 1 and with an auxiliary handle in the extended position, Figure 5 is a fragmentary vertical section taken on line 5—5 of Figure 4 illustrating an endless track member, Figure 6 is a horizontal section taken on line 6—6 of Figure 5, Figure 7 is an enlarged sectional view taken on line 7—7 of Figure 2 and, Figure 8 is a section taken on line 8—8 of Figure 2.

Referring specifically to the drawings, the numeral 5 designates spaced apart and parallel tubular side frame members. The frame members are connected at their lower ends by transversely extending and horizontally disposed appliance support 6 of generally L-shape. The support 6 is covered by suitable cushion members 7, while the forward edges of the frame members 5 are covered for their full width by cushion strips 8. The strips 7 and 8 serve to prevent damage to the finish of an appliance supported thereon. The side frame members 5 are further connected adjacent their upper ends by a cradle appliance bar 9 and a handle bar 10, both being rigidly connected to the frame members 5 in any desirable manner. The frame members 5 at their upper ends are further provided with preferably looped hand grips 11. Ground wheels 12 are rotatably supported upon stub shafts 13 adjacent the lower ends of the frame members 5 and the ground wheels 12 are so positioned that they will be ground engaging when the truck is disposed in a vertical position and with the appliance support 6 being in a flat position upon the ground.

Disposed within the frame members 5 adjacent their lower ends are endless track devices 14, each embodying an endless belt 15, the vertical flights of which are parallel with the frame members 5. One vertical flight of the belt 15 projects rearwardly of the rear edges of the frame members 5 through slotted openings 16. The projecting flight of the belt 15 serves as an endless track having an over-all length capable of simultaneously engaging a pair of adjacent noses of a conventional stairway tread, shown in dotted lines in Figure 1. The belt 15 is formed of flexible material calculated to withstand excessive wear and may be formed of rubber, a composition of materials, all of which are calculated to serve the particular purpose with a maximum life. The extended flight of the belt 15 is supported against inward flexing for its major length by a plurality of relatively closely arranged rollers 17 that are freely rotatably supported upon shouldered stub shafts 18 that extend between the side walls of the frame members 5. The shouldered stub shafts 18 pass through suitable openings formed in the side walls of the frame member 5 and are rigidly anchored therein by nuts 19. The shoulders of the shafts 18 prevent any inward flexing of the side walls of the frame members 5 when the nuts 19 are turned up tightly and assure that the rollers 17 will be freely rotatable. It will be observed in Figure 6 that the bearing surface of the belt 15 is slightly inwardly from the tread surface of the ground wheels 12, thus permitting the truck to be shifted in a horizontal position without contacting engagement of the endless track. The upper and lower ends of the belt 15 are further supported by rollers 20, carried by stub shafts 21, similar to the stub shafts 18. The arrangement of the rollers is such as to facilitate the installation of the belts 15, should it be necessary that these belts be replaced at any time.

The numeral 22 designates an auxiliary lifting handle as a whole embodying a pair of parallel arcuate bars 23, connected at one end by preferably cylindrical bar 24 that serves as a hand grip. The opposite ends of the bars 23 are pivotally connected at 25 with links 26 that are in turn pivotally connected at 27 to the inner side walls of the frame members 5. The handle member 22 in the fully retracted position, as shown in Figure 3, lies wholly within the frame members 5 and in a position that offers no interference with an appliance to be loaded upon a truck. A spring detent 28 is fixed upon the rear wall of the support 6 substantially intermediate its length and lies in the path of swinging movement of the bar 24 to serve as a means for retaining the handle in the fully retracted position against accidental shifting. When the handle 22 is to be employed as an auxiliary lifting means, the bar 24 is disengaged from the detent 28 and the links 26 and the connected arcuate bars 23 are shifted rearwardly in a manner to project the bars 23 beneath the support 6, as shown in Figure 1. The bar 24 when engaged by an operator fulcrums against the support 6, limiting the upward swinging movement of the bar due to its connection with the links 26 and effectively serves as a lifting handle that is associated with the truck in a manner to be at all times available and has no parts that are detachable and which may become lost or misplaced. Thus, the handle 22 is always available when needed and is quickly and easily retracted to the inactive position.

Means are provided to securely bind the appliance upon the truck that comprises an encircling strap 29, formed of leather, woven fabric or any other desirable material. The strap 29 is permanently anchored upon the outer side wall of one frame member 5, as at 30. Means are provided to wind the opposite end of the strap under sufficient tension to securely bind the appliance in position against shifting, such winding means embodying a flat plate 31 that is welded or otherwise rigidly connected with the outer side wall of the opposite frame 5. The plate 31 has been apertured to rotatably support the vertical shaft 32 that is rigidly connected at its upper end with a circular disc 33 that is rotatably supported upon the upper face of the plate 31. The disc 33 carries a pair of upstanding parallel pins 34 upon which the strap 29 is first looped from one to the other and then wound in a clockwise direction to impart adequate tension upon the strap. The means for rotating the shaft 32 and its associated disc 33 comprises a ratchet wheel 35 that is formed integrally with a set of bevelled teeth 36, for a purpose to be described. The ratchet wheel and its associated bevelled portion 36 is preferably provided with an integral squared hub section 37. The ratchet wheel and its bevelled portion and the hub section 37 are keyed or otherwise connected with the shaft 32 and retained thereon against displacement by a locknut 38. An operating handle 39 having a bifurcated portion 40 is pivotally connected to the opposite sides of the hub portion 37 by pins 41, preferably imparting frictional engagement between the bifurcations and the side walls and hub 37. Preferably formed integral with the handle 39 is a housing 42 carrying a spring projected dog 43 that has ratchet engagement with the teeth of the ratchet wheel 35. The bifurcations 40 thus permit the pivotal swinging movement downwardly of the handle 39 and its associated dog 43 to an inactive position where it is disposed out of possible engagement with either the appliance as supported on the truck or possible contacting engagement with the wall areas when the truck is transported over a conventional stairway. The depending position of the handle 39 is illustrated in Figure 1. To facilitate the re-engagement of the dog 43 with the ratchet wheel 35, the handle is swung upwardly, causing the dog 43 to over-ride the bevelled portion 36 for accurate engagement with the teeth of the ratchet wheel. A pawl 44 is normally engaged with the teeth of the ratchet wheel to prevent a reverse rotation thereof when the strap 29 is under tension. A spring 45 yieldably urges the pawl into latching engagement with the ratchet wheel. To release the tension upon the strap 29, the pawl 44 is disengaged from the ratchet wheel 35 in an obvious manner, permitting the disc 33 to rotate in a counter-clockwise direction sufficient to remove the tension from the strap 29.

In the use of the device, the truck is placed in an upright position and the appliance usually tilted sufficient to engage the support 6 therebeneath. The strap 29 is then passed about the appliance with its free end engaged about the pins 34, after which the handle 39 is elevated and the ratchet operated to wind the strap upon the pins 34 in a manner illustrated in Figure 7 to a point where sufficient tension is placed thereon to rigidly maintain the appliance against shifting movement with respect to the truck. The truck and its supported appliance may then be conveyed upon the ground wheels 12 and, when the truck is to be loaded within a transfer device, such as that illustrated in Figure 1 and with the truck being disposed at an angle, the operator then shifts the handle 22 downwardly and forwardly beneath the truck to the point where the operator may grasp the bar 24 for bodily lifting the lower end of the truck and its supported appliance, after which the truck may be slid or otherwise shifted into the transport device. When the truck and its supported load is to be conveyed up a stairway, it is first rolled to the lower step, at which point the endless belt track 14 will engage the nose portions of the treads and, with the handle 22 being projected, an operator will obviously grasp the handle loops 11 while a second operator grasps the handle bar 24 at which time the truck and its supported load may traverse the steps in a relatively easy manner, and with the endless track simultaneously engaging at least two of the nose portions of the stair treads. After the appliance has been positioned, the operator releases the pawl 44, permitting the tension upon the strap 29 to be relieved at which time the strap may be disengaged from the pins 34 and swung out of engagement with the appliance. However, prior to the unloading of the appliance, the handle 22 is retracted to its inactive position and latched into engagement with the detent 28. When cylindrical objects are to be conveyed upon the truck, they are first engaged with the support 6 and then rocked into engagement with the cradle bar 9, after which the strap 29 is engaged thereabout and placed under adequate tension as before stated.

It will be apparent from the foregoing that a very novel form of hand truck has been provided. The device embodies the desirable characteristics necessary to the moving or conveying of relatively heavy appliances, both from the standpoint of transportation over a level area or for convenient and easy transportation up an incline passageway, such as a conventional staircase. The handle 22 is most effective as a ready means to enable an assistant operator to handle the truck and a supported load and may be quickly and easily shifted from an active to an inactive position. The tension means for the strap 29 is novel in that it is a complete assembly that is shiftable to and from a position of operation, thus avoiding any objectionable projections that might interfere with the freedom of operation of the device.

It is to be understood that the invention is not limited to the precise arrangements shown, but that changes are contemplated as readily fall within the spirit of the invention as determined by the scope of the subjoined claim.

Having described my invention, what I claim as new and desire to secure by Letters Patent is:

A hand truck of the character described that comprises a pair of parallel side frame members provided at their upper ends with hand grips, the frame members being connected at their lower ends by a projecting appliance support, ground wheels rotatably supported adjacent the lower ends of the frame members, endless tread trackways housed within the side frame members adjacent their lower ends and with the lower flight of each of said endless tread trackways projecting rearwardly therefrom, each of the endless treads being supported against upward flexing of the projecting portion by a plurality of rollers, the said side frame members being formed tubular and rectangular in cross-section, the rear edges of each frame member adjacent their lower ends being slotted whereby the flight of the endless trackways projects outwardly and in parallelism with the frame members, the said tread supporting rollers being closely arranged and freely rotatable upon fixed shouldered stub-shafts that are connected to the opposite side walls of the frame members, and whereby to prevent flexing of the frame members against the rollers, the opposite ends of the trackways are supported and guided by rollers that are arranged in a guiding arc and whereby the endless tread is supported against flexing upon its bearing surface and at its opposite ends, the said end rollers being rotatable upon fixed shouldered stub-shafts that are rigidly connected to the side of the frame members, the upper flight of the treads being unsupported and wholly housed within the frame members.

References Cited in the file of this patent
UNITED STATES PATENTS

| | | |
|---|---|---|
| 2,165,603 | Yeats | July 11, 1939 |
| 2,214,311 | Stevens | Sept. 10, 1940 |
| 2,301,341 | Stevens et al. | Nov. 10, 1942 |
| 2,519,113 | Cohn | Aug. 15, 1950 |
| 2,607,606 | Millen | Aug. 19, 1952 |
| 2,620,041 | Chenette et al. | Dec. 2, 1952 |
| 2,623,760 | Fornelius | Dec. 30, 1952 |